US009388828B2

(12) United States Patent
Hillman et al.

(10) Patent No.: US 9,388,828 B2
(45) Date of Patent: Jul. 12, 2016

(54) HYDRAULIC CONTROL SYSTEM HAVING SWING MOTOR ENERGY RECOVERY

(71) Applicant: Caterpillar Inc., Peoria, IL (US)

(72) Inventors: Bryan J. Hillman, Peoria, IL (US); Jiao Zhang, Naperville, IL (US); Lawrence C. Tognetti, Peoria, IL (US); Peter Spring, Reutigen (CH); Rustu Cesur, Lombard, IL (US); Tonglin Shang, Bolingbrook, IL (US)

(73) Assignee: Caterpillar Inc., Peoria, IL (US)

( * ) Notice: Subject to any disclaimer, the term of this patent is extended or adjusted under 35 U.S.C. 154(b) by 777 days.

(21) Appl. No.: 13/718,855

(22) Filed: Dec. 18, 2012

(65) Prior Publication Data

US 2014/0060022 A1 Mar. 6, 2014

Related U.S. Application Data

(60) Provisional application No. 61/695,646, filed on Aug. 31, 2012.

(51) Int. Cl.

*F16D 31/02* (2006.01)
*F15B 1/02* (2006.01)

(Continued)

(52) U.S. Cl.

CPC . *F15B 1/02* (2013.01); *E02F 9/123* (2013.01); *E02F 9/2217* (2013.01);

(Continued)

(58) Field of Classification Search

CPC ..................................................... F15B 1/0275
USPC .................................... 60/413, 414, 415, 418
See application file for complete search history.

(56) References Cited

U.S. PATENT DOCUMENTS

| | | | | |
|---|---|---|---|---|
| 2,470,778 | A | 5/1949 | Lankovski et al. | |
| 3,946,560 | A * | 3/1976 | Mac Intosh .......... | B62D 11/183 180/6.3 |

(Continued)

FOREIGN PATENT DOCUMENTS

| | | |
|---|---|---|
| GB | 889893 | 9/1960 |
| JP | 56-090159 | 7/1981 |

(Continued)

OTHER PUBLICATIONS

U.S. Patent Application of Rustu Cesur et al. entitled "Hydraulic Control System Having Electronic Flow Limiting" filed on Dec. 18, 2012.

(Continued)

*Primary Examiner* — Nathaniel Wiehe
*Assistant Examiner* — Dustin T Nguyen
(74) *Attorney, Agent, or Firm* — Finnegan, Henderson, Farabow, Garrett & Dunner, LLP

(57) ABSTRACT

A hydraulic control system is disclosed for use with a machine. The hydraulic control system may have a tank, a pump, a swing motor, and at least one control. The hydraulic control system may further have an accumulator configured to receive fluid from and supply fluid to the swing motor, a charge valve movable to allow fluid flow from the swing motor into the accumulator, and a discharge valve movable to allow fluid flow from the accumulator to the swing motor. The hydraulic control system may additionally have a controller in communication with the at least one control valve, the charge valve, and the discharge valve. The controller may be configured to detect an acceleration of the swing motor, selectively cause the discharge valve to assist the acceleration, and selectively move the charge valve to an open position to recover energy associated with pressure spikes occurring during the acceleration.

24 Claims, 3 Drawing Sheets

(51) Int. Cl.

| | |
|---|---|
| ***F15B 21/14*** | (2006.01) |
| ***E02F 9/12*** | (2006.01) |
| ***E02F 9/22*** | (2006.01) |

(52) U.S. Cl.

CPC .............. *E02F 9/2296* (2013.01); *F15B 1/024* (2013.01); *F15B 21/14* (2013.01); *F15B 2211/625* (2013.01); *F15B 2211/6306* (2013.01); *F15B 2211/6313* (2013.01); *F15B 2211/7058* (2013.01); *F15B 2211/88* (2013.01)

(56) References Cited

U.S. PATENT DOCUMENTS

| | | | | |
|---|---|---|---|---|
| 4,665,697 | A | 5/1987 | Dantlgraber | |
| 4,757,685 | A | 7/1988 | Burckhartzmeyer | |
| 5,067,321 | A | 11/1991 | Miyaoka | |
| 5,197,864 | A | 3/1993 | Lunzman et al. | |
| 5,575,148 | A | 11/1996 | Hirata et al. | |
| 5,622,226 | A | 4/1997 | Hausman et al. | |
| 5,630,316 | A | 5/1997 | Itsuji et al. | |
| 5,692,377 | A | 12/1997 | Moriya et al. | |
| 5,955,706 | A | 9/1999 | Fonkalsrud et al. | |
| 6,009,708 | A | 1/2000 | Miki et al. | |
| 6,058,343 | A | 5/2000 | Orbach et al. | |
| 6,094,911 | A | 8/2000 | Crawshaw | |
| 6,151,894 | A | 11/2000 | Endo et al. | |
| 6,275,757 | B1 | 8/2001 | Watanabe et al. | |
| 6,393,838 | B1 | 5/2002 | Moriya et al. | |
| 6,705,079 | B1 | 3/2004 | Tabor et al. | |
| 6,892,102 | B1 | 5/2005 | Fushimi | |
| 6,981,371 | B2 | 1/2006 | Imanishi et al. | |
| 7,059,125 | B2 | 6/2006 | Oka et al. | |
| 7,059,126 | B2 | 6/2006 | Ma | |
| 7,121,189 | B2 | 10/2006 | Vonderwell et al. | |
| 7,124,576 | B2 | 10/2006 | Cherney et al. | |
| 7,165,950 | B2 | 1/2007 | Fenny et al. | |
| 7,260,931 | B2 | 8/2007 | Egelja et al. | |
| 7,296,404 | B2 | 11/2007 | Pfaff | |
| 7,392,653 | B2 | 7/2008 | Sugano | |
| 7,487,707 | B2 | 2/2009 | Pfaff et al. | |
| 7,596,893 | B2 | 10/2009 | Tozawa et al. | |
| 7,748,279 | B2 | 7/2010 | Budde et al. | |
| 7,823,379 | B2 | 11/2010 | Hamkins et al. | |
| 7,908,852 | B2 | 3/2011 | Zhang et al. | |
| 7,934,329 | B2 | 5/2011 | Mintah et al. | |
| 7,979,181 | B2 | 7/2011 | Clark et al. | |
| 8,020,583 | B2 | 9/2011 | Christensen et al. | |
| 8,626,326 | B1 * | 1/2014 | Theobald | B25J 9/144 60/413 |
| 8,850,806 | B2 * | 10/2014 | Zhang | E02F 9/123 60/327 |
| 2004/0055455 | A1 | 3/2004 | Tabor et al. | |
| 2005/0081518 | A1 | 4/2005 | Ma et al. | |
| 2009/0031720 | A1 | 2/2009 | Son | |
| 2009/0217653 | A1 * | 9/2009 | Zhang | E02F 9/2217 60/414 |
| 2011/0302914 | A1 | 12/2011 | Helbling | |

FOREIGN PATENT DOCUMENTS

| | | |
|---|---|---|
| JP | 56-131802 | 10/1981 |
| JP | 60-215103 | 10/1985 |
| JP | 63-067403 | 3/1988 |
| JP | 63-167171 | 7/1988 |
| JP | 02-43419 | 2/1990 |
| JP | 03-69861 | 3/1991 |
| JP | 05-287774 | 11/1993 |
| JP | 10-103112 | 4/1998 |
| JP | 2000-213644 | 8/2000 |
| JP | 2004-125094 | 4/2004 |
| JP | 2005-003183 | 1/2005 |

OTHER PUBLICATIONS

U.S. Patent Application of Jiao Zhang et al. entitled "Hydraulic Control System Having Swing Motor Energy Recovery" filed on Dec. 18, 2012.

U.S. Patent Application of Rustu Cesur et al. entitled "Hydraulic Control System Having Swing Motor Energy Recovery" filed on Dec. 18, 2012.

U.S. Appl. No. 13/714,064 of Tonglin Shang et al. entitled "Hydraulic Control System Having Swing Oscillation Dampening" filed on Dec. 13, 2012.

U.S. Appl. No. 13/714,017 of Randal N. Peterson et al. entitled "Hydraulic Control System Having Over-Pressure Protection" filed on Dec. 13, 2012.

U.S. Appl. No. 13/713,988 of Rustu Cesur et al. entitled "Adaptive Work Cycle Control System" filed on Dec. 13, 2012.

U.S. Appl. No. 13/170,960 of Pengfei Ma et al. entitled "Hydraulic Control System Having Energy Recovery Kit" filed on Jun. 28, 2011.

U.S. Appl. No. 13/171,007 of Pengfei Ma et al. entitled "Hydraulic Control System Having Swing Energy Recovery" filed on Jun. 28, 2011.

U.S. Appl. No. 13/171,047 of Jiao Zhang et al. entitled "Hydraulic Control System Having Swing Motor Energy Recovery" filed on Jun. 28, 2011.

U.S. Appl. No. 13/171,110 of Jiao Zhang et al. entitled "Hydraulic Control System Having Swing Motor Energy Recovery" filed on Jun. 28, 2011.

U.S. Appl. No. 13/171,146 of Jiao Zhang et al. entitled "Energy Recovery System Having Accumulator and Variable Relief" filed on Jun. 28, 2011.

* cited by examiner

HYDRAULIC CONTROL SYSTEM HAVING SWING MOTOR ENERGY RECOVERY

RELATED APPLICATIONS

This application is based on and claims the benefit of priority from U.S. Provisional Application No. 61/695,646 by HILLMAN et al., filed Aug. 31, 2012, the contents of which are expressly incorporated herein by reference.

TECHNICAL FIELD

The present disclosure relates generally to a hydraulic control system and, more particularly, to a hydraulic control system having swing energy recovery.

BACKGROUND

Swing-type excavation machines, for example hydraulic excavators and front shovels, require significant hydraulic pressure and flow to transfer material from a dig location to a dump location. These machines direct the high-pressure fluid from an engine-driven pump through a swing motor to accelerate a loaded work tool at the start of each swing, and then restrict the flow of fluid exiting the motor at the end of each swing to slow and stop swinging of the work tool.

One problem associated with this type of hydraulic arrangement involves efficiency. In particular, the fluid exiting the swing motor at the end of each swing is under a relatively high pressure due to deceleration of the loaded work tool. Unless recovered, energy associated with the high-pressure fluid may be wasted. In addition, restriction of this high-pressure fluid exiting the swing motor at the end of each swing can result in heating of the fluid, which must be accommodated with an increased cooling capacity of the machine.

One attempt to improve the efficiency of a swing-type machine is disclosed in U.S. Pat. No. 7,908,852 of Zhang et al. that issued on Mar. 22, 2011 (the '852 patent). The '852 patent discloses a hydraulic control system for a machine that includes an accumulator. The accumulator stores exit oil from a swing motor that has been pressurized by inertia torque applied on the moving swing motor by an upper structure of the machine. The pressurized oil in the accumulator is then selectively reused to accelerate the swing motor during a subsequent swing by supplying the accumulated oil back to the swing motor.

Although the hydraulic control system of the '852 patent may help to improve efficiencies of a swing-type machine in some situations, it may still be less than optimal. In particular, there may be no way to recover energy from pressure spikes during a discharge event of the accumulator disclosed in the '852 patent. Likewise, no method of charging the accumulator during a neutral swing event is disclosed. Finally, the accumulator of the '852 patent may have limited ability to recover energy at the end of a swinging deceleration event, when swinging motions have slowed significantly.

The disclosed hydraulic control system is directed to overcoming one or more of the problems set forth above and/or other problems of the prior art.

SUMMARY

One aspect of the present disclosure is directed to a hydraulic control system. The hydraulic control system may include a tank, a pump configured to draw fluid from the tank and pressurize the fluid, and a swing motor driven by a flow of pressurized fluid from the pump. The hydraulic control system may also include at least one control valve configured to control fluid flow between the pump, the swing motor, and the tank. The hydraulic control system may further include an accumulator configured to selectively receive pressurized fluid discharged from the swing motor and selectively supply pressurized fluid to the swing motor, a charge valve movable from a closed position to an open position to selectively allow fluid flow from the swing motor into the accumulator, and a discharge valve movable from a closed position to an open position to selectively allow fluid flow from the accumulator to the swing motor. The hydraulic control system may additionally include a controller in communication with the at least one control valve, the charge valve, and the discharge valve. The controller may be configured to detect an acceleration of the swing motor, selectively cause the discharge valve to assist the acceleration, and selectively move the charge valve to an open position to recover energy associated with pressure spikes occurring during the acceleration.

Another aspect of the present disclosure is directed to another hydraulic control system. This hydraulic control system may include a tank, a pump configured to draw fluid from the tank and pressurize the fluid, and a swing motor driven by a flow of pressurized fluid from the pump. The hydraulic control system may also include at least one control valve configured to control fluid flow between the pump, the swing motor, and the tank. The hydraulic control system may further include an accumulator configured to selectively receive pressurized fluid discharged from the swing motor and selectively supply pressurized fluid to the swing motor, and a charge valve movable from a closed position to an open position to selectively allow fluid flow from the swing motor into the accumulator. The hydraulic control system may additionally include a controller in communication with the at least one control valve and the charge valve. The controller may be configured to detect a deceleration of the swing motor, determine a desired opening amount of the charge valve based on a parameter of the deceleration, compare the desired opening amount to a minimum opening amount greater than zero, and selectively move the charge valve to the greater of the desired opening amount and the minimum opening amount during the deceleration.

Another aspect of the present disclosure is directed to another hydraulic control system. This hydraulic control system may include a tank, a pump configured to draw fluid from the tank and pressurize the fluid, and a swing motor driven by a flow of pressurized fluid from the pump. The hydraulic control system may also include at least one control valve configured to control fluid flow between the pump, the swing motor, and the tank. The hydraulic control system may further include an accumulator configured to selectively receive pressurized fluid discharged from the swing motor and selectively supply pressurized fluid to the swing motor, and a charge valve movable from a closed position to an open position to selectively allow fluid flow from the swing motor into the accumulator. The hydraulic control system may additionally include a controller in communication with the at least one control valve and the charge valve. The controller may be configured to detect a neutral operation of the swing motor, and selectively move the charge valve to a minimum opening amount greater than zero during the neutral operation.

Still another aspect of the present disclosure is directed to yet another hydraulic control system. The hydraulic control system may include a tank, a pump configured to draw fluid from the tank and pressurize the fluid, and a swing motor driven by a flow of pressurized fluid from the pump. The hydraulic control system may also include at least one control valve configured to control fluid flow between the pump, the swing motor, and the tank. The hydraulic control system may further include an accumulator configured to selectively receive pressurized fluid discharged from the swing motor and selectively supply pressurized fluid to the swing motor, and a charge valve movable from a closed position to an open position to selectively allow fluid flow from the swing motor into the accumulator. The hydraulic control system may additionally include a controller in communication with the at least one control valve, and the charge valve. The controller may be configured to detect any one of a neutral operation, an acceleration operation, or a deceleration operation of the swing motor, and selectively move the charge valve to an open position based on the detection.

A still further aspect of the present disclosure may be directed to a method of controlling a swing motor of a hydraulic control system for a machine. The method may include driving the swing motor with a flow of pressurized fluid from a pump, controlling fluid flow between the pump and the swing motor, and selectively supplying pressurized fluid from the swing motor through a charge valve into an accumulator. The method may also include selectively supplying fluid flow from the accumulator through a discharge valve to the swing motor. The method may further include detecting an acceleration of the swing motor, opening the discharge valve to assist the acceleration, and moving the charge valve to an open position to recover energy associated with pressure spikes occurring during the acceleration.

DETAILED DESCRIPTION

Figure 1:
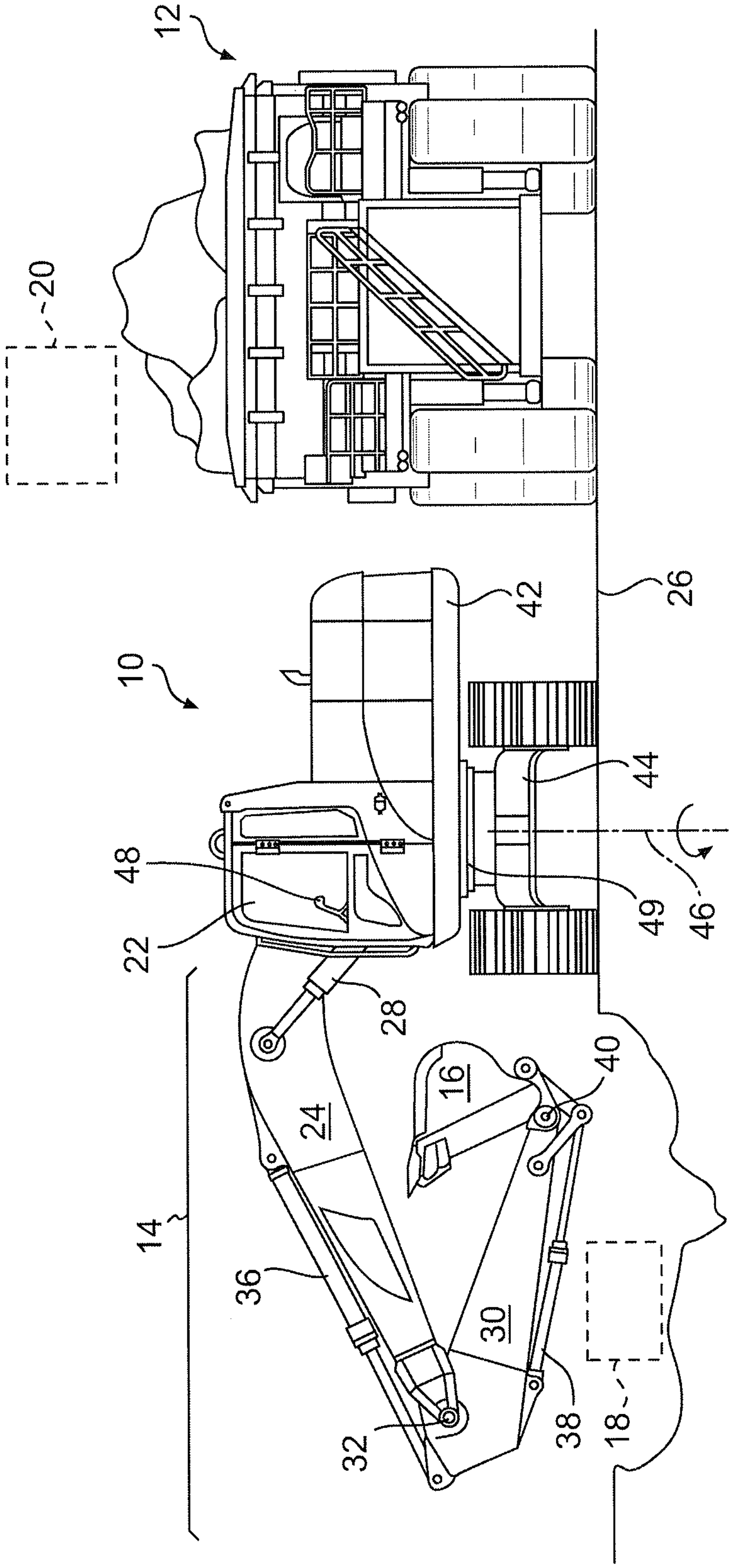
FIG. 1 is a diagrammatic illustration of an exemplary disclosed machine operating at a worksite with a haul vehicle.

FIG. 1 illustrates an exemplary machine 10 having multiple systems and components that cooperate to excavate and load earthen material onto a nearby haul vehicle 12. In the depicted example, machine 10 is a hydraulic excavator. It is contemplated, however, that machine 10 could alternatively embody another swing-type excavation or material handling machine, such as a backhoe, a front shovel, a dragline excavator, or another similar machine. Machine 10 may include, among other things, an implement system 14 configured to move a work tool 16 between a dig location 18 within a trench or at a pile, and a dump location 20, for example over haul vehicle 12. Machine 10 may also include an operator station 22 for manual control of implement system 14. It is contemplated that machine 10 may perform operations other than truck loading, if desired, such as craning, trenching, and material handling.

Implement system 14 may include a linkage structure acted on by fluid actuators to move work tool 16. Specifically, implement system 14 may include a boom 24 that is vertically pivotal relative to a work surface 26 by a pair of adjacent, double-acting, hydraulic cylinders 28 (only one shown in FIG. 1). Implement system 14 may also include a stick 30 that is vertically pivotal about a horizontal pivot axis 32 relative to boom 24 by a single, double-acting, hydraulic cylinder 36. Implement system 14 may further include a single, double-acting, hydraulic cylinder 38 that is operatively connected to work tool 16 to tilt work tool 16 vertically about a horizontal pivot axis 40 relative to stick 30. Boom 24 may be pivotally connected to a frame 42 of machine 10, while frame 42 may be pivotally connected to an undercarriage member 44 and swung about a vertical axis 46 by a swing motor 49. Stick 30 may pivotally connect work tool 16 to boom 24 by way of pivot axes 32 and 40. It is contemplated that a greater or lesser number of fluid actuators may be included within implement system 14 and connected in a manner other than described above, if desired.

Numerous different work tools 16 may be attachable to a single machine 10 and controllable via operator station 22. Work tool 16 may include any device used to perform a particular task such as, for example, a bucket, a fork arrangement, a blade, a shovel, a crusher, a shear, a grapple, a grapple bucket, a magnet, or any other task-performing device known in the art. Although connected in the embodiment of FIG. 1 to lift, swing, and tilt relative to machine 10, work tool 16 may alternatively or additionally rotate, slide, extend, open and close, or move in another manner known in the art.

Operator station 22 may be configured to receive input from a machine operator indicative of a desired work tool movement. Specifically, operator station 22 may include one or more input devices 48 embodied, for example, as single or multi-axis joysticks located proximal an operator seat (not shown). Input devices 48 may be proportional-type controllers configured to position and/or orient work tool 16 by producing work tool position signals that are indicative of a desired work tool speed and/or force in a particular direction. The position signals may be used to actuate any one or more of hydraulic cylinders 28, 36, 38 and/or swing motor 49. It is contemplated that different input devices may alternatively or additionally be included within operator station 22 such as, for example, wheels, knobs, push-pull devices, switches, pedals, and other operator input devices known in the art.

Figure 2:
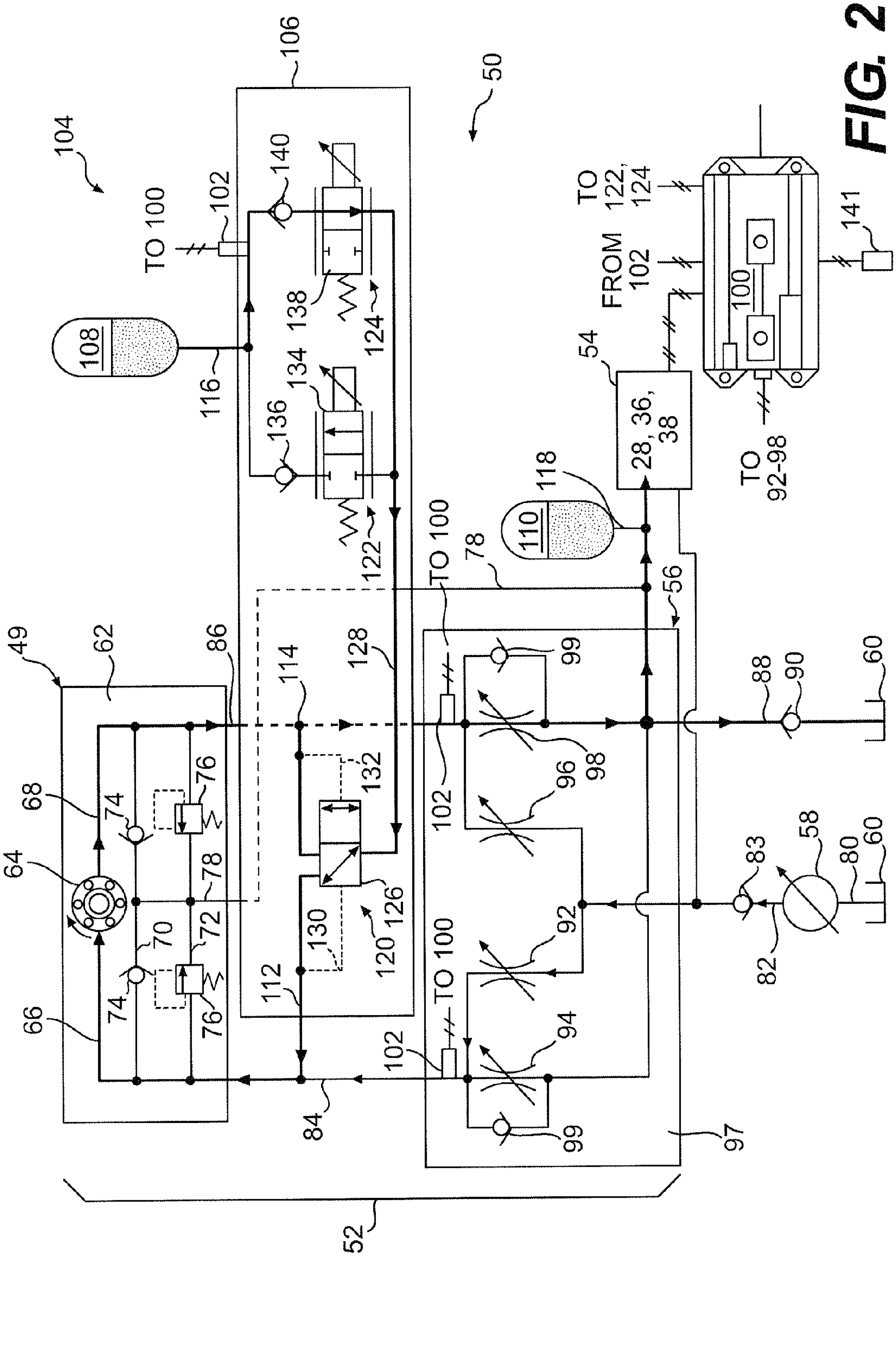
FIG. 2 is a schematic illustration of an exemplary disclosed hydraulic control system that may be used with the machine of FIG. 1.

As illustrated in FIG. 2, machine 10 may include a hydraulic control system 50 having a plurality of fluid components that cooperate to move implement system 14 (referring to FIG. 1). In particular, hydraulic control system 50 may include a first circuit 52 associated with swing motor 49, and at least a second circuit 54 associated with hydraulic cylinders 28, 36, and 38. First circuit 52 may include, among other things, a swing control valve 56 connected to regulate a flow of pressurized fluid from a pump 58 to swing motor 49 and from swing motor 49 to a low-pressure tank 60 to cause a swinging movement of work tool 16 about axis 46 (referring to FIG. 1) in accordance with an operator request received via input device 48. Second circuit 54 may include similar control valves, for example a boom control valve (not shown), a stick control valve (not shown), a tool control valve (not shown), a travel control valve (not shown), and/or an auxiliary control valve connected in parallel to receive pressurized fluid from pump 58 and to discharge waste fluid to tank 60, thereby regulating the corresponding actuators (e.g., hydraulic cylinders 28, 36, and 38).

Swing motor 49 may include a housing 62 at least partially forming a first and a second chamber (not shown) located to either side of an impeller 64. When the first chamber is connected to an output of pump 58 (e.g., via a first chamber passage 66 formed within housing 62) and the second chamber is connected to tank 60 (e.g., via a second chamber passage 68 formed within housing 62), impeller 64 may be driven to rotate in a first direction (shown in FIG. 2). Conversely, when the first chamber is connected to tank 60 via first chamber passage 66 and the second chamber is connected to pump 58 via second chamber passage 68, impeller 64 may be driven to rotate in an opposite direction (not shown). The flow rate of fluid through impeller 64 may relate to a rotational speed of swing motor 49, while a pressure differential across impeller 64 may relate to an output torque thereof.

Swing motor 49 may include built-in makeup and relief functionality. In particular, a makeup passage 70 and a relief passage 72 may be formed within housing 62, between first chamber passage 66 and second chamber passage 68. A pair of opposing check valves 74 and a pair of opposing relief valves 76 may be disposed within makeup and relief passages 70, 72, respectively. A low-pressure passage 78 may be connected to each of makeup and relief passages 70, 72 at locations between check valves 74 and between relief valves 76. Based on a pressure differential between low-pressure passage 78 and first and second chamber passages 66, 68, one of check valves 74 may open to allow fluid from low-pressure passage 78 into the lower-pressure one of the first and second chambers. Similarly, based on a pressure differential between first and second chamber passages 66, 68 and low-pressure passage 78, one of relief valves 76 may open to allow fluid from the higher-pressure one of the first and second chambers into low-pressure passage 78. A significant pressure differential may generally exist between the first and second chambers during a swinging movement of implement system 14.

Pump 58 may be configured to draw fluid from tank 60 via an inlet passage 80, pressurize the fluid to a desired level, and discharge the fluid to first and second circuits 52, 54 via a discharge passage 82. A check valve 83 may be disposed within discharge passage 82, if desired, to provide for a unidirectional flow of pressurized fluid from pump 58 into first and second circuits 52, 54. Pump 58 may embody, for example, a variable displacement pump (shown in FIG. 1), a fixed displacement pump, or another source known in the art. Pump 58 may be drivably connected to a power source (not shown) of machine 10 by, for example, a countershaft (not shown), a belt (not shown), an electrical circuit (not shown), or in another suitable manner. Alternatively, pump 58 may be indirectly connected to the power source of machine 10 via a torque converter, a reduction gear box, an electrical circuit, or in any other suitable manner. Pump 58 may produce a stream of pressurized fluid having a pressure level and/or a flow rate determined, at least in part, by demands of the actuators within first and second circuits 52, 54 that correspond with operator requested movements. Discharge passage 82 may be connected within first circuit 52 to first and second chamber passages 66, 68 via swing control valve 56 and first and second chamber conduits 84, 86, respectively, which extend between swing control valve 56 and swing motor 49.

Tank 60 may constitute a reservoir configured to hold a low-pressure supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 60. It is contemplated that hydraulic control system 50 may be connected to multiple separate fluid tanks or to a single tank, as desired. Tank 60 may be fluidly connected to swing control valve 56 via a drain passage 88, and to first and second chamber passages 66, 68 via swing control valve 56 and first and second chamber conduits 84, 86, respectively. Tank 60 may also be connected to low-pressure passage 78. A check valve 90 may be disposed within drain passage 88, if desired, to promote a unidirectional flow of fluid into tank 60.

Swing control valve 56 may have elements that are movable to control the rotation of swing motor 49 and corresponding swinging motion of implement system 14. Specifically, swing control valve 56 may include a first chamber supply element 92, a first chamber drain element 94, a second chamber supply element 96, and a second chamber drain element 98 all disposed within a common block or housing 97. The first and second chamber supply elements 92, 96 may be connected in parallel with discharge passage 82 to regulate filling of their respective chambers with fluid from pump 58, while the first and second chamber drain elements 94, 98 may be connected in parallel with drain passage 88 to regulate draining of the respective chambers of fluid. A makeup valve 99, for example a check valve, may be disposed between an outlet of first chamber drain element 94 and first chamber conduit 84 and between an outlet of second chamber drain element 98 and second chamber conduit 86.

To drive swing motor 49 to rotate in a first direction (shown in FIG. 2), first chamber supply element 92 may be shifted to allow pressurized fluid from pump 58 to enter the first chamber of swing motor 49 via discharge passage 82 and first chamber conduit 84, while second chamber drain element 98 may be shifted to allow fluid from the second chamber of swing motor 49 to drain to tank 60 via second chamber conduit 86 and drain passage 88. To drive swing motor 49 to rotate in the opposite direction, second chamber supply element 96 may be shifted to communicate the second chamber of swing motor 49 with pressurized fluid from pump 58, while second chamber drain element 98 may be shifted to allow draining of fluid from the first chamber of swing motor 49 to tank 60. It is contemplated that both the supply and drain functions of swing control valve 56 (i.e., of the four different supply and drain elements) may alternatively be performed by a single valve element associated with the first chamber and a single valve element associated with the second chamber, or by a single valve element associated with both the first and second chambers, if desired.

Supply and drain elements 92-98 of swing control valve 56 may be solenoid-movable against a spring bias in response to a flow rate and/or position command issued by a controller 100. In particular, swing motor 49 may rotate at a velocity that corresponds with the flow rate of fluid into and out of the first and second chambers and with a torque that corresponds with a pressure differential across impeller 64. To achieve an operator-desired swing torque, a command based on an assumed or measured pressure drop may be sent to the solenoids (not shown) of supply and drain elements 92-98 that causes them to open an amount corresponding to the necessary fluid flow rates and/or pressure differential at swing motor 49. This command may be in the form of a flow rate command or a valve element position command that is issued by controller 100.

Controller 100 may be in communication with the different components of hydraulic control system 50 to regulate operations of machine 10. For example, controller 100 may be in communication with the elements of swing control valve 56 in first circuit 52 and with the elements of control valves (not shown) associated with second circuit 54. Based on various operator input and monitored parameters, as will be described in more detail below, controller 100 may be configured to selectively activate the different control valves in a coordinated manner to efficiently carry out operator requested movements of implement system 14.

Controller 100 may include a memory, a secondary storage device, a clock, and one or more processors that cooperate to accomplish a task consistent with the present disclosure. Numerous commercially available microprocessors can be configured to perform the functions of controller 100. It should be appreciated that controller 100 could readily embody a general machine controller capable of controlling numerous other functions of machine 10. Various known circuits may be associated with controller 100, including signal-conditioning circuitry, communication circuitry, and other appropriate circuitry. It should also be appreciated that controller 100 may include one or more of an application-specific integrated circuit (ASIC), a field-programmable gate array (FPGA), a computer system, and a logic circuit configured to allow controller 100 to function in accordance with the present disclosure.

The operational parameters monitored by controller 100, in one embodiment, may include a pressure of fluid within first and/or second circuits 52, 54. For example, one or more pressure sensors 102 may be strategically located within first chamber and/or second chamber conduits 84, 86 to sense a pressure of the respective passages and generate a corresponding signal indicative of the pressure directed to controller 100. It is contemplated that any number of pressure sensors 102 may be placed in any location within first and/or second circuits 52, 54, as desired. It is further contemplated that other operational parameters such as, for example, speeds, temperatures, viscosities, densities, etc. may also or alternatively be monitored and used to regulate operation of hydraulic control system 50, if desired.

Hydraulic control system 50 may be fitted with an energy recovery arrangement 104 that is in communication with at least first circuit 52 and configured to selectively extract and recover energy from waste fluid that is discharged from swing motor 49. Energy recovery arrangement (ERA) 104 may include, among other things, a recovery valve block (RVB) 106 that is fluidly connectable between pump 58 and swing motor 49, a first accumulator 108 configured to selectively communicate with swing motor 49 via RVB 106, and a second accumulator 110 also configured to selectively and directly communicate with swing motor 49. In the disclosed embodiment, RVB 106 may be fixedly and mechanically connectable to one or both of swing control valve 56 and swing motor 49, for example directly to housing 62 and/or directly to housing 97. RVB 106 may include an internal first passage 112 fluidly connectable to first chamber conduit 84, and an internal second passage 114 fluidly connectable to second chamber conduit 86. First accumulator 108 may be fluidly connected to RVB 106 via a conduit 116, while second accumulator 110 may be fluidly connectable to low-pressure and drain passages 78 and 88, in parallel with tank 60, via a conduit 118.

RVB 106 may house a selector valve 120, a charge valve 122 associated with first accumulator 108, and a discharge valve 124 associated with first accumulator 108 and disposed in parallel with charge valve 122. Selector valve 120 may automatically fluidly communicate one of first and second passages 112, 114 with charge and discharge valves 122, 124 based on a pressure of first and second passages 112, 114. Charge and discharge valves 122, 124 may be selectively movable in response to commands from controller 100 to fluidly communicate first accumulator 108 with selector valve 120 for fluid charging and discharging purposes.

Selector valve 120 may be a pilot-operated, 2-position, 3-way valve that is automatically movable in response to fluid pressures in first and second passages 112, 114 (i.e., in response to a fluid pressures within the first and second chambers of swing motor 49). In particular, selector valve 120 may include a valve element 126 that is movable from a first position (shown in FIG. 2) at which first passage 112 is fluidly connected to charge and discharge valves 122, 124 via an internal passage 128, toward a second position (not shown) at which second passage 114 is fluidly connected to charge and discharge valves 122, 124 via passage 128. When first passage 112 is fluidly connected to charge and discharge valves 122, 124 via passage 128, fluid flow through second passage 114 may be inhibited by selector valve 120 and vice versa. First and second pilot passages 130, 132 may communicate fluid from first and second passages 112, 114 to opposing ends of valve element 126 such that a higher-pressure one of first or second passages 112, 114 may cause valve element 126 to move and fluidly connect the corresponding passage with charge and discharge valves 122, 124 via passage 128.

Charge valve 122 may be a solenoid-operated, variable position, 2-way valve that is movable in response to a command from controller 100 to allow fluid from passage 128 to enter first accumulator 108. In particular, charge valve 122 may include a valve element 134 that is movable from a first position (shown in FIG. 2) at which fluid flow from passage 128 into first accumulator 108 is inhibited, toward a second position (not shown) at which passage 128 is fluidly connected to first accumulator 108. When valve element 134 is away from the first position (i.e., in the second position or in an intermediate position between the first and second positions) and a fluid pressure within passage 128 exceeds a fluid pressure within first accumulator 108, fluid from passage 128 may fill (i.e., charge) first accumulator 108. Valve element 134 may be spring-biased toward the first position and movable in response to a command from controller 100 to any position between the first and second positions to thereby vary a flow rate of fluid from passage 128 into first accumulator 108. A check valve 136 may be disposed between charge valve 122 and first accumulator 108 to provide for a unidirectional flow of fluid into accumulator 108 via charge valve 122.

Discharge valve 124 may be substantially identical to charge valve 122 in composition, and movable in response to a command from controller 100 to allow fluid from first accumulator 108 to enter passage 128 (i.e., to discharge). In particular, discharge valve 124 may include a valve element 138 that is movable from a first position (not shown) at which fluid flow from first accumulator 108 into passage 128 is inhibited, toward a second position (shown in FIG. 2) at which first accumulator 108 is fluidly connected to passage 128. When valve element 138 is away from the first position (i.e., in the second position or in an intermediate position between the first and second positions) and a fluid pressure within first accumulator 108 exceeds a fluid pressure within passage 128, fluid from first accumulator 108 may flow into passage 128. Valve element 138 may be spring-biased toward the first position and movable in response to a command from controller 100 to any position between the first and second positions to thereby vary a flow rate of fluid from first accumulator 108 into passage 128. A check valve 140 may be disposed between first accumulator 108 and discharge valve 124 to provide for a unidirectional flow of fluid from accumulator 108 into passage 128 via discharge valve 124.

An additional pressure sensor 102 may be associated with first accumulator 108 and configured to generate signals indicative of a pressure of fluid within first accumulator 108, if desired. In the disclosed embodiment, the additional pressure sensor 102 may be disposed between first accumulator 108 and discharge valve 124. It is contemplated, however, that the additional pressure sensor 102 may alternatively be disposed between first accumulator 108 and charge valve 122 or directly connected to first accumulator 108, if desired. Signals from this additional pressure sensor 102 may be directed to controller 100 for use in regulating operation of charge and/or discharge valves 122, 124.

First and second accumulators 108, 110 may each embody pressure vessels filled with a compressible gas that are configured to store pressurized fluid for future use by swing motor 49. The compressible gas may include, for example, nitrogen, argon, helium, or another appropriate compressible gas. As fluid in communication with first and second accumulators 108, 110 exceeds predetermined pressures of first and second accumulators 108, 110, the fluid may flow into accumulators 108, 110. Because the gas therein is compressible, it may act like a spring and compress as the fluid flows into first and second accumulators 108, 110. When the pressure of the fluid within conduits 116, 118 drops below the predetermined pressures of first and second accumulators 108, 110, the compressed gas may expand and urge the fluid from within first and second accumulators 108, 110 to exit. It is contemplated that first and second accumulators 108, 110 may alternatively embody membrane/spring-biased or bladder types of accumulators, if desired.

In the disclosed embodiment, first accumulator 108 may be a larger (i.e., about 5-20 times larger) and higher-pressure (i.e., about 5-60 times higher-pressure) accumulator, as compared to second accumulator 110. Specifically, first accumulator 108 may be configured to accumulate up to about 50-100 L of fluid having a pressure in the range of about 260-315 bar, while second accumulator 110 may be configured to accumulate up to about 10 L of fluid having a pressure in the range of about 5-30 bar. In this configuration, first accumulator 108 may be used primarily to assist the motion of swing motor 49 and to improve machine efficiencies, while second accumulator may be used primarily as a makeup accumulator to help reduce a likelihood of voiding at swing motor 49. It is contemplated, however, that other volumes and pressures may be accommodated by first and/or second accumulators 108, 110, if desired.

Controller 100 may be configured to selectively cause first accumulator 108 to charge and discharge, thereby improving performance of machine 10. In particular, a typical swinging motion of implement system 14 instituted by swing motor 49 may consist of segments of time during which swing motor 49 is accelerating a swinging movement of implement system 14, and segments of time during which swing motor 49 is decelerating the swinging movement of implement system 14. The acceleration segments may require significant energy from swing motor 49 that is conventionally realized by way of pressurized fluid supplied to swing motor 49 by pump 58, while the deceleration segments may produce significant energy in the form of pressurized fluid that is conventionally wasted through discharge to tank 60. Both the acceleration and the deceleration segments may require swing motor 49 to convert significant amounts of hydraulic energy to swing kinetic energy, and vice versa. The fluid passing through swing motor 49 during deceleration, however, still contains a large amount of energy. The fluid passing through swing motor 49 may be pressurized during deceleration as a result of restrictions to the flow of the fluid exiting swing motor 49. If the fluid passing through swing motor 49 is selectively collected within first accumulator 108 during the deceleration segments, this energy can then be returned to (i.e., discharged) and reused by swing motor 49 during the ensuing acceleration segments. Swing motor 49 can be assisted during the acceleration segments by selectively causing first accumulator 108 to discharge pressurized fluid into the higher-pressure chamber of swing motor 49 (via discharge valve 124, passage 128, selector valve 120, and the appropriate one of first and second chamber conduits 84, 86), alone or together with high-pressure fluid from pump 58, thereby propelling swing motor 49 at the same or greater rate with less pump power than otherwise possible via pump 58 alone. Swing motor 49 can be assisted during the deceleration segments by selectively causing first accumulator 108 to charge with fluid exiting swing motor 49, thereby providing additional resistance to the motion of swing motor 49 and lowering a restriction and cooling requirement of the fluid exiting swing motor 49.

In an alternative embodiment, controller 100 may be configured to selectively control charging of first accumulator 108 with fluid exiting pump 58, as opposed to fluid exiting swing motor 49. That is, during a peak-shaving or economy mode of operation, controller 100 may be configured to cause accumulator 108 to charge with fluid exiting pump 58 (e.g., via control valve 56, the appropriate one of first and second chamber conduits 84, 86, selector valve 120, passage 128, and charge valve 122) when pump 58 has excess capacity (i.e., a capacity greater than required by circuits 52, 52 to move work tool 16 as requested by the operator). Then, during times when pump 58 has insufficient capacity to adequately power swing motor 49, the high-pressure fluid previously collected from pump 58 within first accumulator 108 may be discharged in the manner described above to assist swing motor 49.

Controller 100 may be configured to regulate the charging and discharging of first accumulator 108 based on a current or ongoing segment of the excavation, material handling, or other work cycle of machine 10. In particular, based on input received from one or more performance sensors 141, controller 100 may be configured to partition a typical work cycle performed by machine 10 into a plurality of segments, for example, into a dig segment, a swing-to-dump acceleration segment, a swing-to-dump deceleration segment, a dump segment, a swing-to-dig acceleration segment, and a swing-to-dig deceleration segment. Based on the segment of the excavation work cycle currently being performed, controller 100 may selectively cause first accumulator 108 to charge or discharge, thereby assisting swing motor 49 during the acceleration and deceleration segments.

One or more maps and/or dynamic elements relating signals from sensor(s) 141 to the different segments of the excavation work cycle may be stored within the memory of controller 100. Each of these maps may include a collection of data in the form of tables, graphs, and/or equations. The dynamic elements may include integrators, filters, rate limiters, and delay elements. In one example, threshold speeds, cylinder pressures, and/or operator input (i.e., lever position) associated with the start and/or end of one or more of the segments may be stored within the maps. In another example, threshold forces and/or actuator positions associated with the start and/or end of one or more of the segments may be stored within the maps. Controller 100 may be configured to reference the signals from sensor(s) 141 with the maps and filters stored in memory to determine the segment of the excavation work cycle currently being executed, and then regulate the charging and discharging of first accumulator 108 accordingly. Controller 100 may allow the operator of machine 10 to directly modify these maps and/or to select specific maps from available relationship maps stored in the memory of controller 100 to affect segment partitioning and accumulator control, as desired. It is contemplated that the maps may additionally or alternatively be automatically selectable based on modes of machine operation, if desired.

Sensor(s) 141 may be associated with the generally horizontal swinging motion of work tool 16 imparted by swing motor 49 (i.e., the motion of frame 42 relative to undercarriage member 44). For example, sensor 141 may embody a rotational position or speed sensor associated with the operation of swing motor 49, an angular position or speed sensor associated with the pivot connection between frame 42 and undercarriage member 44, a local or global coordinate position or speed sensor associated with any linkage member connecting work tool 16 to undercarriage member 44 or with work tool 16 itself, a displacement sensor associated with movement of operator input device 48, or any other type of sensor known in the art that may generate a signal indicative of a swing position, speed, force, or other swing-related parameter of machine 10. The signal generated by sensor(s) 141 may be sent to and recorded by controller 100 during each excavation work cycle. It is contemplated that controller 100 may derive a swing speed based on a position signal from sensor 141 and an elapsed period of time, if desired.

Alternatively or additionally, sensor(s) 141 may be associated with the vertical pivoting motion of work tool 16 imparted by hydraulic cylinders 28 (i.e., associated with the lifting and lowering motions of boom 24 relative to frame 42). Specifically, sensor 141 may be an angular position or speed sensor associated with a pivot joint between boom 24 and frame 42, a displacement sensor associated with hydraulic cylinders 28, a local or global coordinate position or speed sensor associated with any linkage member connecting work tool 16 to frame 42 or with work tool 16 itself, a displacement sensor associated with movement of operator input device 48, or any other type of sensor known in the art that may generate a signal indicative of a pivoting position or speed of boom 24. It is contemplated that controller 100 may derive a pivot speed based on a position signal from sensor 141 and an elapsed period of time, if desired.

In yet an additional embodiment, sensor(s) 141 may be associated with the tilting force of work tool 16 imparted by hydraulic cylinder 38. Specifically, sensor 141 may be a pressure sensor associated with one or more chambers within hydraulic cylinder 38 or any other type of sensor known in the art that may generate a signal indicative of a tilting force of machine 10 generated during a dig and dump operation of work tool 16.

It should be noted that controller 100 may be limited during the charging and discharging of first accumulator 108 by fluid pressures within first chamber conduit 84, second chamber conduit 86, and first accumulator 108. That is, even though a particular segment in the work cycle of machine 10 during a particular mode of operation may call for charging or discharging of first accumulator 108, controller 100 may only be allowed to implement the action when the related pressures have corresponding values. For example, if sensors 102 indicate that a pressure of fluid within first accumulator 108 is below a pressure of fluid within first chamber conduit 84, controller 100 may not be allowed to initiate discharging of first accumulator 108 into first chamber conduit 84. Similarly, if sensors 102 indicate that a pressure of fluid within second chamber conduit 86 is less than a pressure of fluid within first accumulator 108, controller 100 may not be allowed to initiate charging of first accumulator 108 with fluid from second chamber conduit 86. Not only could the exemplary processes be difficult (if not impossible) to implement at particular times when the related pressures are inappropriate, but an attempt to implement the processes could result in undesired machine performance.

During the discharging of pressurized fluid from first accumulator 108 to swing motor 49, the fluid exiting swing motor 49 may still have an elevated pressure that, if allowed to drain into tank 60, may be wasted. At this time, second accumulator 110 may be configured to charge with fluid exiting swing motor 49 any time that first accumulator 108 is discharging fluid to swing motor 49. In addition, during the charging of first accumulator 108, it may be possible for swing motor 49 to receive too little fluid from pump 58 and, unless otherwise accounted for, the insufficient supply of fluid from pump 58 to swing motor 49 under these conditions could cause swing motor 49 to cavitate. Accordingly, second accumulator 110 may be configured to discharge to swing motor 49 any time that first accumulator 108 is charging with fluid from swing motor 49.

As described above, second accumulator 110 may discharge fluid any time a pressure within low-pressure passage 78 falls below the pressure of fluid within second accumulator 110. Accordingly, the discharge of fluid from second accumulator 110 into first circuit 52 may not be directly regulated via controller 100. However, because second accumulator 110 may charge with fluid from first circuit 52 whenever the pressure within drain passage 88 exceeds the pressure of fluid within second accumulator 110, and because control valve 56 may affect the pressure within drain passage 88, controller 100 may have some control over the charging of second accumulator 110 with fluid from first circuit 52 via control valve 56.

In some situations, it may be possible for both first and second accumulators 108, 110 to simultaneously charge with pressurized fluid. These situations may correspond, for example, with operation in the peak-shaving modes. In particular, it may be possible for second accumulator 110 to charge with pressurized fluid at the same time that pump 58 is providing pressurized fluid to both swing motor 49 and to first accumulator 108. At these times, the fluid exiting pump 58 may be directed into first accumulator 108, while the fluid exiting swing motor 49 may be directed into second accumulator 110.

Second accumulator 110 may also be charged via second circuit 54, if desired. In particular, any time waste fluid from second circuit 54 (i.e., fluid draining from second circuit 54 to tank 60) has a pressure greater than the threshold pressure of second accumulator 110, the waste fluid may be collected within second accumulator 110. In a similar manner, pressurized fluid within second accumulator 110 may be selectively discharged into second circuit 54 when the pressure within second circuit 54 falls below the pressure of fluid collected within second accumulator 110.

Figure 3:
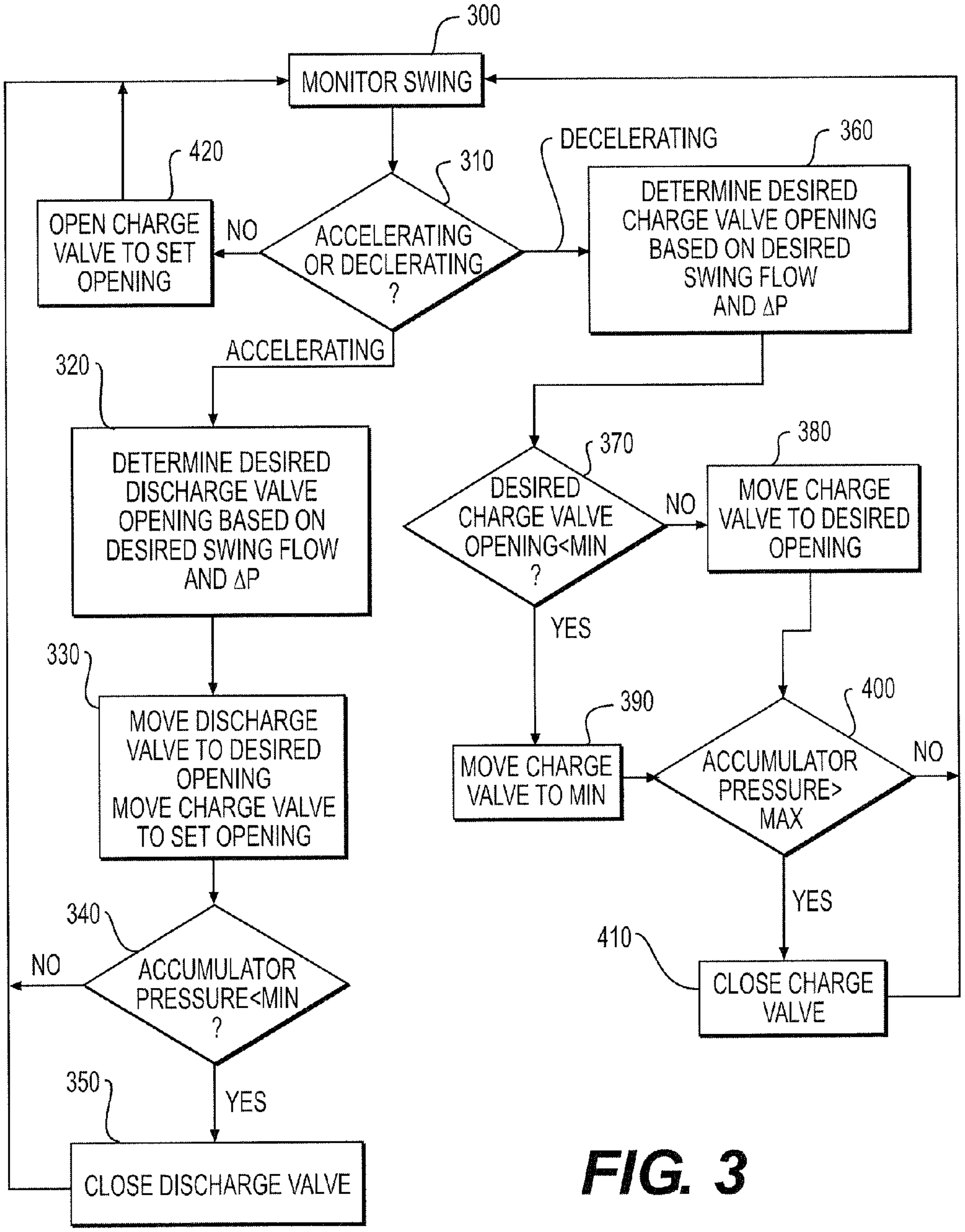
FIG. 3 is a flowchart depicting an exemplary disclosed process that may be performed by the hydraulic control system of FIG. 2.

It may be possible in some situations to experience inefficiencies during charging and discharging of first accumulator 108. For example, it may be possible for work tool 16 or a member of implement system 14 that is connected to work tool 16 to engage an immovable object. When this happens, the actuator(s) moving work tool 16 may suddenly stop moving and/or be caused to reverse their movement directions. Such a sudden stop or direction reversal can cause a corresponding pressure spike within first and/or second circuits 52, 54 that cannot normally be recovered. Controller 100, however, may be configured to accommodate these sudden pressure spikes and recover energy from them by controlling charge and discharge valves 122, 124 in a unique way depending on the current accumulator operation (i.e., whether first accumulator 108 is charging or discharging). FIG. 3 illustrates a control process implemented by controller 100 to accommodate and recover energy from sudden pressure spikes. FIG. 3 will be discussed in more detail below to further illustrate the disclosed concepts.

INDUSTRIAL APPLICABILITY

The disclosed hydraulic control system may be applicable to any excavation machine that performs a substantially repetitive work cycle, which involves swinging movements of a work tool. The disclosed hydraulic control system may help to improve machine performance and efficiency by assisting swinging acceleration and deceleration of the work tool with an accumulator during different segments of the work cycle. The unique method used by the disclosed hydraulic control system may help ensure smooth operation and energy recovery even during sudden and unexpected pressure spikes. Operation of the disclosed hydraulic control system will now be described in detail with reference to FIG. 3.

During normal operation, controller 100 may monitor swinging operations of machine 10 (Step 300). In particular, controller 100 may receive input indicative of a desired speed of swing motor 49, an actual speed of swing motor 49, and a pressure gradient across swing motor 49. The input indicative of the desired speed may be a signal generated by operator input device 48, while the input indicative of actual speed may be a signal generated by performance sensor 141 associated with swing motor 49. The input indicative of the pressure gradient across swing motor 49 may include signals generated by pressure sensors 102. It is contemplated that other input indicative of the desired speed, actual speed, and/or pressure gradient of swing motor 49 may also or alternatively be utilized, if desired.

Controller 100 may then determine if the swinging operation monitored in step 300 is an acceleration or a deceleration (Step 310). Any method known in the art may be used to determine the current swinging operation of machine 10. For example, controller 100 may determine if machine 10 is accelerating or decelerating based on the pressure differential across swing motor 49, based on input from an acceleration sensor, based on input from a velocity sensor, based on operator input (e.g., desired swing speed), and/or in any other method known in the art.

When controller 100 determines that swing motor 49 is accelerating or should accelerate, controller 100 may utilize pressurized fluid stored within first accumulator 108 to assist the movement of work tool 16. In particular, controller 100 may determine a desired discharge valve opening based on, among other things, a desired flow rate of fluid through swing motor 49 and a desired pressure differential across swing motor 49 (Step 320). The desired swing flow rate and desired pressure differential may be determined as functions of lever position of input device 48, actual pressures at swing motor 49, and actual pressures at first accumulator 108. Controller 100 may then command discharge valve 124 to move to the desired opening and, at about the same time, also command charge valve 122 to open by a set amount (Step 330). The opening of discharge valve 124 may result in a supply of pressurized fluid being directed from first accumulator 108 to swing motor 49, thereby driving swing motor 49 to accelerate.

During the acceleration of swing motor 49 that is driven by first accumulator 108, it may be possible for pressure spikes to occur within first circuit 52 (Step 340). As described above, these pressure spikes may occur when work tool 16 or another member of implement system 14 engages an immovable object. When this happens, instead of the pressure spike resulting in spillage of pressurized fluid over relief valves 76, the highly pressurized fluid may instead be directed through the already open charge valve 122 and recuperated within first accumulator 108. Check valve 136 may help ensure that the wave of high pressure fluid flows into first accumulator 108 and that no fluid from first accumulator 108 passes back through charge valve 122 in an uncontrolled manner.

After and/or during completion of step 330, controller 100 may compare the pressure of first accumulator 108 with a minimum threshold pressure. As long as the pressure within first accumulator 108 remains sufficiently high (i.e., as long as first accumulator 108 has the capacity to accelerate swing motor 49) control may loop back through step 300. However, if the pressure of fluid within first accumulator 108 falls below the minimum threshold pressure, controller 100 may close discharge valve 124 (Step 350) before looping back to step 300. It is contemplated that charge valve 122 may remain open or be closed at this time.

Returning to step 310, when controller 100 determines that swing motor 49 is decelerating or should decelerate, controller 100 may control first accumulator 108 to assist the slowing of work tool 16. In particular, controller 100 may determine a desired charge valve opening based on, among other things, a desired flow rate of fluid through swing motor 49 and a desired pressure differential across swing motor 49 (Step 360). The desired swing flow rate and desired pressure differential may be determined as functions of lever position of input device 48, actual pressures at swing motor 49, and actual pressures at first accumulator 108. Controller 100 may then compare the desired charge valve opening to a minimum charge valve opening (Step 370) and selectively implement the greater opening. In particular, when the desired charge valve opening is greater than the minimum charge valve opening, controller 100 may move charge valve 122 to the desired opening (Step 380). Otherwise, controller 100 may move charge valve 122 to the minimum opening (Step 390). In the disclosed embodiment, the minimum opening of charge valve 122 may be a set opening that is greater than zero (i.e., at least some flow of pressurized fluid is allowed to enter charge valve 122 when charge valve 122 is set to the minimum opening). This minimum opening may help to ensure that pressure spikes that suddenly occur during slow speeds of swing motor 49, when charge valve 122 is normally open by only a small amount, may still be captured within first accumulator 108 instead of resulting in spillage over relief valves 76. The opening of charge valve 122 may result in a supply of pressurized fluid from swing motor 49 being captured within first accumulator 108, thereby retarding the motion of swing motor 49.

After and/or during completion of steps 380 and 390, controller 100 may compare the pressure of first accumulator 108 with a maximum threshold pressure (Step 400). As long as the pressure within first accumulator 108 remains sufficiently low (i.e., as long as first accumulator 108 has the capacity to receive more fluid from swing motor 49) control may loop back through step 300. However, if the pressure of fluid within first accumulator 108 rises above the maximum threshold pressure, controller 100 may close charge valve 122 (Step 410) before looping back to step 300.

Returning a last time to step 310, when controller 100 determines that swing motor 49 is neither accelerating or decelerating (i.e., when swing motor 49 is either moving at steady state velocity or not moving at all), controller 100 may move charge valve 122 to a set opening (Step 420) such that any unexpected pressure spikes (e.g., spikes caused by engagement of a member of implement system 14 with an immovable object, spikes caused by gravity, spike caused by other moving objects in the area, etc.) may be recovered within first accumulator 108 instead of resulting in spillage across relief valves 76. In one embodiment, the set opening of charge valve implemented in step 420 may be about the same opening set during steps 330 and 390, although other opening amounts may alternatively be utilized. After completion of step 420, control may return to step 300.

Several benefits may be associated with the disclosed hydraulic control system. First, because hydraulic control system 50 may utilize first accumulator 108 to recover energy during a discharging event, the efficiency of hydraulic control system 50 may be enhanced. Similarly, the ability to capture energy associated with pressure spikes occurring during charging at slow swing motor speeds may increase the capacity of hydraulic control system 50. Finally, because hydraulic control system 50 may also be able to capture spike energy during steady state and/or neutral or non-swinging operations, the capacity of hydraulic control system 50 may be increased.

It will be apparent to those skilled in the art that various modifications and variations can be made to the disclosed hydraulic control system. Other embodiments will be apparent to those skilled in the art from consideration of the specification and practice of the disclosed hydraulic control system. It is intended that the specification and examples be considered as exemplary only, with a true scope being indicated by the following claims and their equivalents.

What is claimed is:

1. A hydraulic control system, comprising:
- a tank;
- a pump configured to draw fluid from the tank and pressurize the fluid;
- a swing motor driven by a flow of pressurized fluid from the pump;
- at least one control valve configured to control fluid flow between the pump, the swing motor, and the tank;
- an accumulator configured to selectively receive pressurized fluid discharged from the swing motor and selectively supply pressurized fluid to the swing motor;
- a charge valve movable from a closed position to an open position to selectively allow fluid flow from the swing motor into the accumulator;
- a discharge valve movable from a closed position to an open position to selectively allow fluid flow from the accumulator to the swing motor; and
- a controller in communication with the at least one control valve, the charge valve, and the discharge valve, the controller being configured to:
  - detect an acceleration of the swing motor;
  - selectively cause the discharge valve to assist the acceleration;
  - selectively move the charge valve to an open position to recover energy associated with pressure spikes occurring during the acceleration;
  - make a comparison of a pressure of the accumulator with a minimum threshold pressure; and
  - selectively move the charge valve to a closed position during acceleration based on the comparison.

2. The hydraulic control system of claim 1, wherein:
- the accumulator is a first accumulator; and
- the hydraulic control system further includes a second accumulator configured to receive fluid exiting the swing motor when fluid is flowing from the first accumulator to the swing motor.

3. The hydraulic control system of claim 1, wherein:
- the accumulator is a first accumulator; and
- the hydraulic control system further includes a second accumulator configured to supply fluid flow to the swing motor when the first accumulator is receiving pressurized fluid discharged from the swing motor.

4. The hydraulic control system of claim 1, wherein the accumulator is further configured to selectively receive pressurized fluid discharged from the pump.

5. The hydraulic control system of claim 1, wherein the controller is further configured to:
- detect a deceleration of the swing motor;
- determine a desired opening amount of the charge valve based on a parameter of the deceleration;
- compare the desired opening amount to a minimum opening amount greater than zero; and
- selectively move the charge valve to the greater of the desired opening amount and the minimum opening amount during the deceleration.

6. The hydraulic control system of claim 5, wherein the controller is further configured to:
- detect a neutral operation of the swing motor; and
- selectively move the charge valve to a minimum opening amount greater than zero during the neutral operation.

7. The hydraulic control system of claim 5, wherein the controller is further configured to:
- make a comparison of a pressure of the accumulator with a maximum threshold pressure; and
- selectively move the charge valve to a closed position during deceleration based on the comparison.

8. The hydraulic control system of claim 1, wherein the controller is further configured to:
- detect a neutral operation of the swing motor; and
- selectively move the charge valve to a minimum opening amount greater than zero during the neutral operation.

9. A hydraulic control system, comprising:
- a tank;
- a pump configured to draw fluid from the tank and pressurize the fluid;
- a swing motor driven by a flow of pressurized fluid from the pump;
- at least one control valve configured to control fluid flow between the pump, the swing motor, and the tank;
- an accumulator configured to selectively receive pressurized fluid discharged from the swing motor and selectively supply pressurized fluid to the swing motor;
- a charge valve movable from a closed position to an open position to selectively allow fluid flow from the swing motor into the accumulator; and
- a controller in communication with the at least one control valve, and the charge valve, the controller being configured to:
  - detect a deceleration of the swing motor;
  - determine a desired opening amount of the charge valve based on a parameter of the deceleration;
  - compare the desired opening amount to a minimum opening amount greater than zero; and
  - selectively move the charge valve to the greater of the desired opening amount and the minimum opening amount during the deceleration.

10. The hydraulic control system of claim 9, wherein:
- the accumulator is a first accumulator; and
- the hydraulic control system further includes a second accumulator configured to receive fluid exiting the swing motor when fluid is flowing from the first accumulator to the swing motor.

11. The hydraulic control system of claim 9, wherein:
- the accumulator is a first accumulator; and
- the hydraulic control system further includes a second accumulator configured to supply fluid flow to the swing motor when the first accumulator is receiving pressurized fluid discharged from the swing motor.

12. The hydraulic control system of claim 9, wherein the accumulator is further configured to selectively receive pressurized fluid discharged from the pump.

13. The hydraulic control system of claim 9, wherein the controller is further configured to:
- detect a neutral operation of the swing motor; and
- selectively move the charge valve to a minimum opening amount greater than zero during the neutral operation.

14. The hydraulic control system of claim 9, wherein the controller is further configured to:

make a comparison of a pressure of the accumulator with a maximum threshold pressure; and selectively move the charge valve to a closed position during deceleration based on the comparison.

15. A hydraulic control system, comprising:

a tank;

a pump configured to draw fluid from the tank and pressurize the fluid;

a swing motor driven by a flow of pressurized fluid from the pump;

at least one control valve configured to control fluid flow between the pump, the swing motor, and the tank;

an accumulator configured to selectively receive pressurized fluid discharged from the swing motor and selectively supply pressurized fluid to the swing motor;

a charge valve movable from a closed position to an open position to selectively allow fluid flow from the swing motor into the accumulator; and a controller in communication with the at least one control valve, and the charge valve, the controller being configured to:

detect a neutral operation of the swing motor; and selectively move the charge valve to a minimum opening amount greater than zero during the neutral operation.

16. The hydraulic control system of claim 15, wherein:

the accumulator is a first accumulator; and the hydraulic control system further includes a second accumulator configured to receive fluid exiting the swing motor when fluid is flowing from the first accumulator to the swing motor.

17. The hydraulic control system of claim 15, wherein:

the accumulator is a first accumulator; and the hydraulic control system further includes a second accumulator configured to supply fluid flow to the swing motor when the first accumulator is receiving pressurized fluid discharged from the swing motor.

18. The hydraulic control system of claim 15, wherein the accumulator is further configured to selectively receive pressurized fluid discharged from the pump.

19. A hydraulic control system, comprising:

a tank;

a pump configured to draw fluid from the tank and pressurize the fluid;

a swing motor driven by a flow of pressurized fluid from the pump;

at least one control valve configured to control fluid flow between the pump, the swing motor, and the tank;

an accumulator configured to selectively receive pressurized fluid discharged from the swing motor and selectively supply pressurized fluid to the swing motor;

a charge valve movable from a closed position to an open position to selectively allow fluid flow from the swing motor into the accumulator; and a controller in communication with the at least one control valve, and the charge valve, the controller being configured to:

making a detection of any one of a neutral operation, an acceleration operation, or a deceleration operation of the swing motor; and selectively move the charge valve to an open position based on the detection being the neutral operation or the acceleration operation.

20. A method of controlling a swing motor of a hydraulic control system for a machine, comprising:

driving the swing motor with a flow of pressurized fluid from a pump;

controlling fluid flow between the pump and the swing motor;

selectively supplying pressurized fluid from the swing motor through a charge valve into an accumulator;

selectively supplying fluid flow from the accumulator through a discharge valve to the swing motor;

detecting an acceleration of the swing motor;

opening the discharge valve to assist the acceleration;

moving the charge valve to an open position to recover energy associated with pressure spikes occurring during the acceleration;

making a comparison of a pressure of the accumulator with a minimum threshold pressure; and selectively moving the charge valve to a closed position during acceleration based on the comparison.

21. The method of claim 20, further including:

detecting a deceleration of the swing motor;

determining a desired opening amount of the charge valve based on a parameter of the deceleration;

comparing the desired opening amount to a minimum opening amount greater than zero; and selectively moving the charge valve to the greater of the desired opening amount and the minimum opening amount during the deceleration.

22. The method of claim 21, further including:

detecting a neutral operation of the swing motor; and selectively moving the charge valve to a minimum opening amount greater than zero during the neutral operation.

23. The method of claim 21, further including:

making a comparison of a pressure of the accumulator with a maximum threshold pressure; and selectively moving the charge valve to a closed position during deceleration based on the comparison.

24. The method of claim 20, further including:

detecting a neutral operation of the swing motor; and selectively moving the charge valve to a minimum opening amount greater than zero during the neutral operation.

* * * * *